(12) United States Patent
Voss et al.

(10) Patent No.: US 11,792,652 B2
(45) Date of Patent: Oct. 17, 2023

(54) METHODS AND ELECTRONIC DEVICES FOR VERIFYING DEVICE IDENTITY DURING SECURE PAIRING

(71) Applicant: Motorola Mobility LLC, Chicago, IL (US)

(72) Inventors: Joel D Voss, Elkhorn, IL (US); Amit Kumar Agrawal, Bangalore (IN)

(73) Assignee: Motorola Mobility LLOC, Chicago, IL (US)

( * ) Notice: Subject to any disclaimer, the term of this patent is extended or adjusted under 35 U.S.C. 154(b) by 106 days.

(21) Appl. No.: 17/380,577

(22) Filed: Jul. 20, 2021

(65) Prior Publication Data

US 2023/0023647 A1 Jan. 26, 2023

(51) Int. Cl.
| | |
|---|---|
| *H04W 12/50* | (2021.01) |
| *H04W 12/069* | (2021.01) |
| *G06K 7/14* | (2006.01) |
| *H04L 9/32* | (2006.01) |
| *H04L 9/08* | (2006.01) |
| *H04W 12/041* | (2021.01) |

(52) U.S. Cl.
CPC .......... *H04W 12/50* (2021.01); *G06K 7/1417* (2013.01); *H04L 9/0838* (2013.01); *H04L 9/3268* (2013.01); *H04W 12/041* (2021.01); *H04W 12/069* (2021.01)

(58) Field of Classification Search
CPC . H04W 12/50; H04W 12/069; H04W 12/041; G06K 7/1417; H04L 9/0838; H04L 9/3268
See application file for complete search history.

(56) References Cited

U.S. PATENT DOCUMENTS

| | | | | |
|---|---|---|---|---|
| 10,657,242 | B1* | 5/2020 | Xia | H04L 63/083 |
| 11,265,721 | B1* | 3/2022 | Satpathy | G06Q 40/12 |
| 2013/0145165 | A1* | 6/2013 | Brown | H04M 1/72412 |
| | | | | 713/176 |
| 2015/0089216 | A1* | 3/2015 | Benoit | H04W 12/06 |
| | | | | 713/156 |

(Continued)

OTHER PUBLICATIONS

"Certificate Verification", Okta Developer; unknown exact publication date but prior to filing of present application; Viewed online Jun. 29, 2021 at https://developer.okta.com/books/api-security/tls/certificate-verification/.

(Continued)

*Primary Examiner* — Mohammad W Reza
(74) *Attorney, Agent, or Firm* — Philip H. Burrus, IV

(57) ABSTRACT

An electronic device includes a first communication device operable across a first medium of communication and a second communication device operable across a second medium of communication that is different from the first medium of communication. One or more processors operable with the first communication device and the second communication device obtain a client certificate digest from a prospective client device using the first communication device. Thereafter, the one or more processors receive a client certificate from a remote electronic device using the second communication device. The one or more processors then verifying that the prospective client device and the remote electronic device are the same device prior to establishing a secure communication session.

20 Claims, 10 Drawing Sheets

(56) References Cited

U.S. PATENT DOCUMENTS

| | | | | |
|---|---|---|---|---|
| 2018/0262486 A1* | 9/2018 | Zhu | ........................ | G06K 19/10 |
| 2020/0286194 A1* | 9/2020 | Li | .......................... | G06Q 40/12 |
| 2020/0344599 A1* | 10/2020 | Duo | ..................... | H04W 60/00 |
| 2020/0394282 A1* | 12/2020 | Wang | .................... | G06F 21/105 |
| 2021/0323664 A1* | 10/2021 | Bruhn | .................. | H04L 9/0825 |
| 2022/0004639 A1* | 1/2022 | Yardi | ................... | H04L 9/0825 |

OTHER PUBLICATIONS

"Common SSL Attacks: SSL & TLS Key Vulnerability", Published by Venafi; Unknown exact publication date but prior to filing of present application; Viewed online Jun. 29, 2021 at https://www.venafi.com/education-center/ssl/common-ssl-attacks.

"How Does Remote Desktop Work?", Published at https://www.cyberlinkasp.com/remote-desktop-work/ on or before Jun. 29, 2021; Viewed online Jun. 29, 2021.

"Server Certificate", Published on Okta Developer at https://developer.okta.com/books/api-security/tls/server-certificates/ on or before Jun. 29, 2021; Viewed online Jun. 29, 2021.

"What is mstsc.exe?", Published online at https://www.file.net/process/mstsc.exe.html on or before Jun. 29, 2021; Viewed online Jun. 29, 2021.

Reiner, "Explain Like I'm 5: Remote Desktop Protocol [RDP]", Cyberark.com; Published Apr. 7, 2020; Viewed online Jun. 29, 2021 at https://www.cyberark.com/resources/threat-research-blog/explain-like-i-m-5-remote-desktop-protocol-rdp.

Russell, Brandon, "Galaxy S21 features wireless suppport for Samsun DeX on PC", Published Feb. 5, 2021; https://www.xda-developers.com/galaxy-s21-wireless-support-samsung-dex-on-pc/; Viewed online Aug. 3, 2021.

* cited by examiner

METHODS AND ELECTRONIC DEVICES FOR VERIFYING DEVICE IDENTITY DURING SECURE PAIRING

BACKGROUND

Technical Field

This disclosure relates generally to electronic devices, and more particularly to electronic devices configured to communicate, either by wire or wirelessly, with other electronic devices.

Background Art

The technology associated with portable electronic devices such as smartphones and tablet computers is continually improving. Illustrating by example, while not too long ago such devices included only grey scale liquid crystal diode displays with large, blocky pixels, modern smartphones, tablet computers, and even smart watches include organic light emitting diode (OLED) displays with incredibly small pixels.

While these OLED displays offer extremely high contrast ratios capable of presenting high dynamic range images and videos, their size remains limited so that these devices can be easily carried in a hand, pocket, or backpack. To enable content received by these devices to be more easily seen, such as when a group wants to watch the content for example, many portable electronic devices include a content redirection feature. Using the content redirection feature, a person may stream a movie through a smartphone, but then redirect the movie to a larger display situated near the smartphone so that a family or other group can watch the movie on the larger display.

To establish a secure communication connection between the portable electronic device and the electronic device having the larger display so that encrypted data can be exchanged, a verification step is generally required. Electronic devices frequently use either secure sockets layer (SSL) or transport layer security (TLS) security certificates for verification. However, malfeasants are now developing malware to coopt SSL/TLS keys and certificates to situate between server and client for the purposes of fraud and data expropriation. It would be advantageous to have improved devices and methods than reduced or eliminated this "man in the middle" problem.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
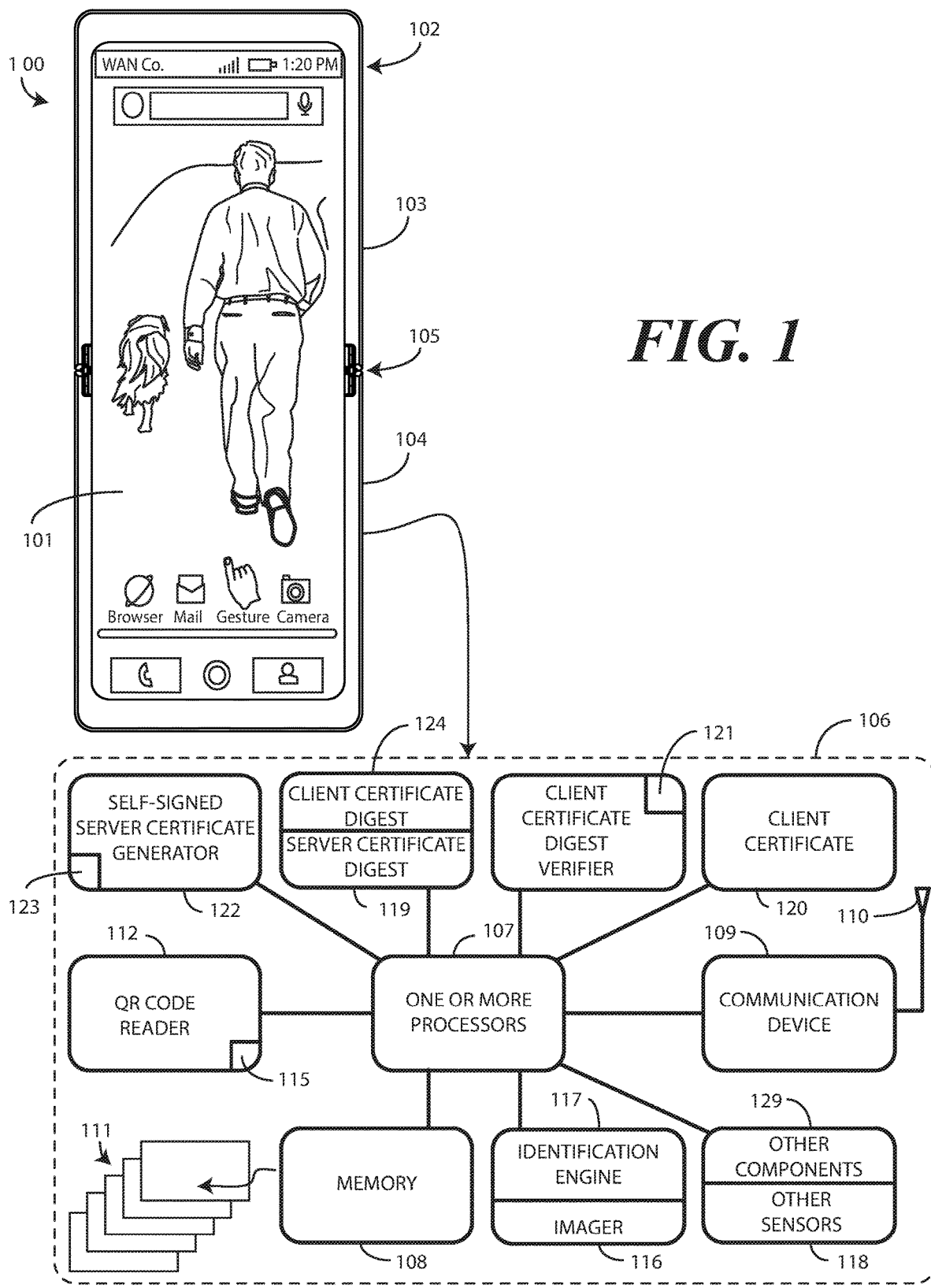
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using an "out of band" pairing step in a pairing process where an electronic device receives client information from a prospective client device seeking to establish a secure communication via a first medium of communication, e.g., an optical medium, while receiving other information such as a client certificate from the prospective client device via a second medium of communication that is different from the first medium of communication, e.g., via radio frequency electronic signals, and verifying that the prospective client device and the remote electronic device are the same device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of using a first medium of communication to gather some information from a prospective client device and a second medium of communication to gather other information from the prospective client device to verify that the gathered information was collected from the same device, without a "man in the middle" as described herein. The non-processor circuits may include, but are not limited to, a radio receiver, a radio transmitter, signal drivers, clock circuits, power source circuits, and user input devices. As such, these functions may be interpreted as steps of a method to perform verification that, for example, information gathered through an optical medium of communication and other information gathered from a radio frequency signal medium of communication was gathered from the same device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, many modern electronic devices are capable of interacting with other electronic devices to share their comparative advantages. Illustrating by example, most smartphones have a relatively small display so that the smartphone can easily fit within the confines of a pocket. By contrast, a television, computer monitor, or computer may have a relatively large display. By establishing a secure communication connection between the smartphone and another electronic device having a larger monitor, the smartphone's processor can perform operations that generate content, while the electronic device with the larger monitor can present that content to a user.

In such systems, one electronic device known as the "server" uses its processors to process data and generate content, while the outputs and inputs of another electronic device known as a "client" are used to control the server. Illustrating by example, in the smartphone-computer example above, the smartphone may act as the server to run applications, stream media, process files and so forth, while a computer with its larger display acts as the client to present the applications, media, or files to a user. The input devices of the computer, e.g., the keyboard, mouse, or touchpad, may then be used to control the operations of the processor within the smartphone.

"Remote Desktop" is an example of one such client server relationship. In this and other similar systems, the server provides the operating system, processors, software, and data, while the client presents the information received from the server on its display or other output. Keystrokes, mouse clicks, and other user inputs received at the client device are then used to control the server's operations. Illustrating by example, a smartphone can use the client-server relationship to operate in a "desktop" mode by presenting a traditional computer user interface on the display of a content presentation companion device such as a television. Alternatively, the smartphone may present content such as videos, images, or other multimedia content on the display of the content presentation companion device.

With the advanced computing power available in smartphones and other electronic devices, users often consume movies, videos, television shows, and other content using these devices. Additionally, they can perform work operations such as sending email, managing files, working on documents and spreadsheets, and so forth. By establishing a secure communication session between a smartphone and a content presentation companion device, the processing power of the smartphone can be leveraged to present content on the display of the content presentation companion device. This allows a user to watch television, play video games, work on homework or office work, make video calls to friends and family, or perform other tasks using the processing power of the smartphone in conjunction with the larger display of a content presentation companion device.

Figure 9:
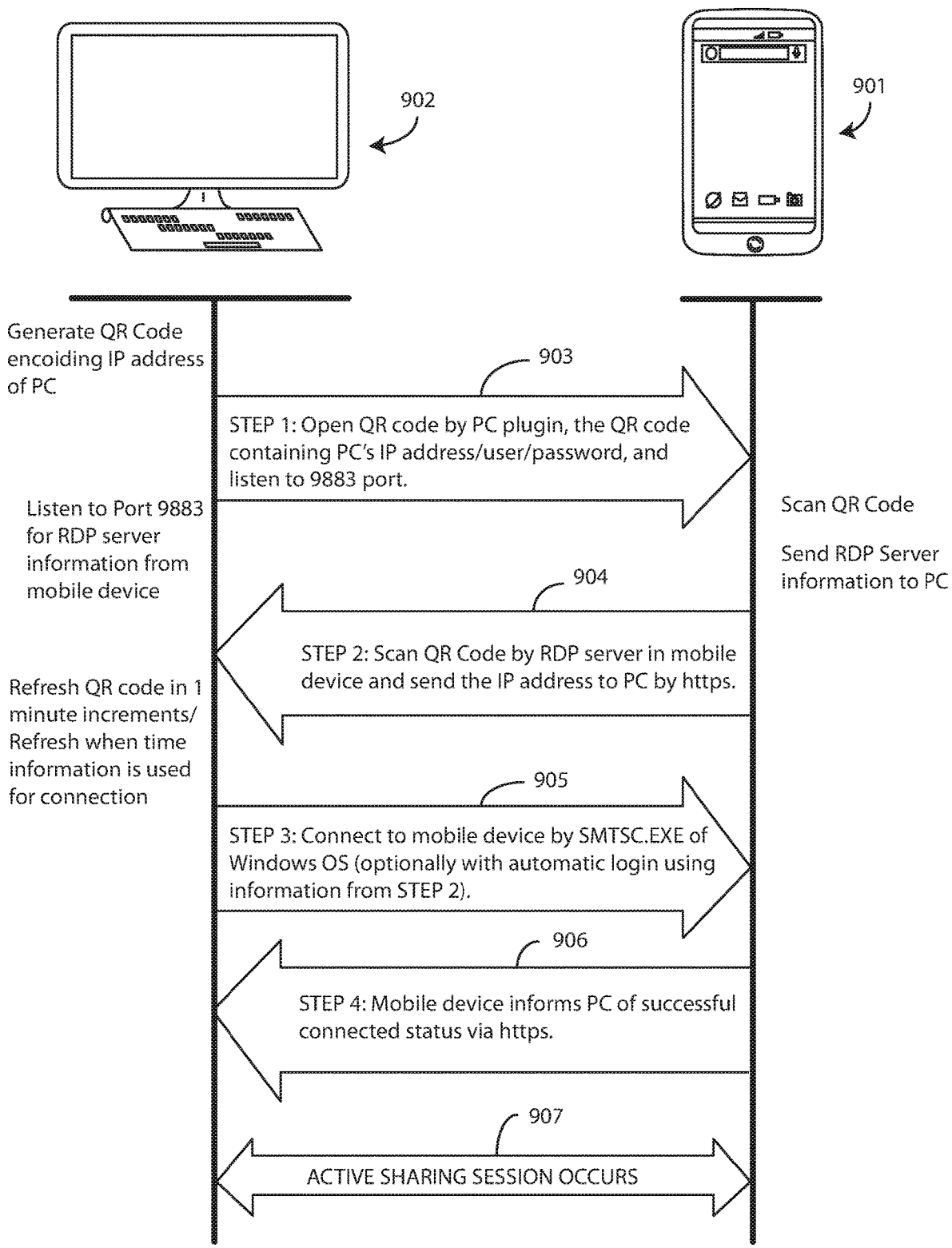
FIG. 9 illustrates a prior art data flow diagram.

Turning first to FIG. 9, illustrated therein is a prior art data flow diagram illustrating a prior art messaging sequence for establishing a remote desktop protocol (RDP) between a server 901, which is illustrated here as a smartphone, and a client 902, which is illustrated here as a computer using remote desktop services (RDS) software manufactured by Microsoft™. In this illustration, the client 902 is configured with a RDP software plugin, while the server 901 is configured with RDP server software.

At step 903, the client 902 generates a quick response (QR) code with the RDP software plugin and presents the QR code on the display of the client 902. The QR code includes the client's Internet protocol (IP) address, a user name, and a password. At step 903, the client 902 also opens a port to listen for server responses. Using RDS software, this port is generally port 9883.

At step 904, the server 901 scans the QR code. The server 901 also transmits its IP address to the client 902 using wired or wireless communications. Using RDS software, the IP address of the server 901 is generally transmitted using the secure hypertext transfer protocol (https).

At step 905, the client 902 initiates a secure communication channel by executing an RDS executable file known in the art as mstsc.exe, which is a software component associated with the Windows™ operating system manufactured by Microsoft™. The mstsc.exe file connects to a server 901 equipped with the RDP server application, thereby allowing the client to run applications and perform other operations on the server 901 as previously described.

At step 906, the server 901 responds to the client 902 informing the client 902 that a successful secure communication session 907 has been established. Data communication can then occur between the server 901 and the client 902 using the secure communication session 907. This data communication will frequently be asymmetrical, as the server 901 typically sends large amounts of information to the client 902, while the client 902 sends relatively little information to the server 901 in response to user input and other operations occurring at the client 902.

Figure 10:
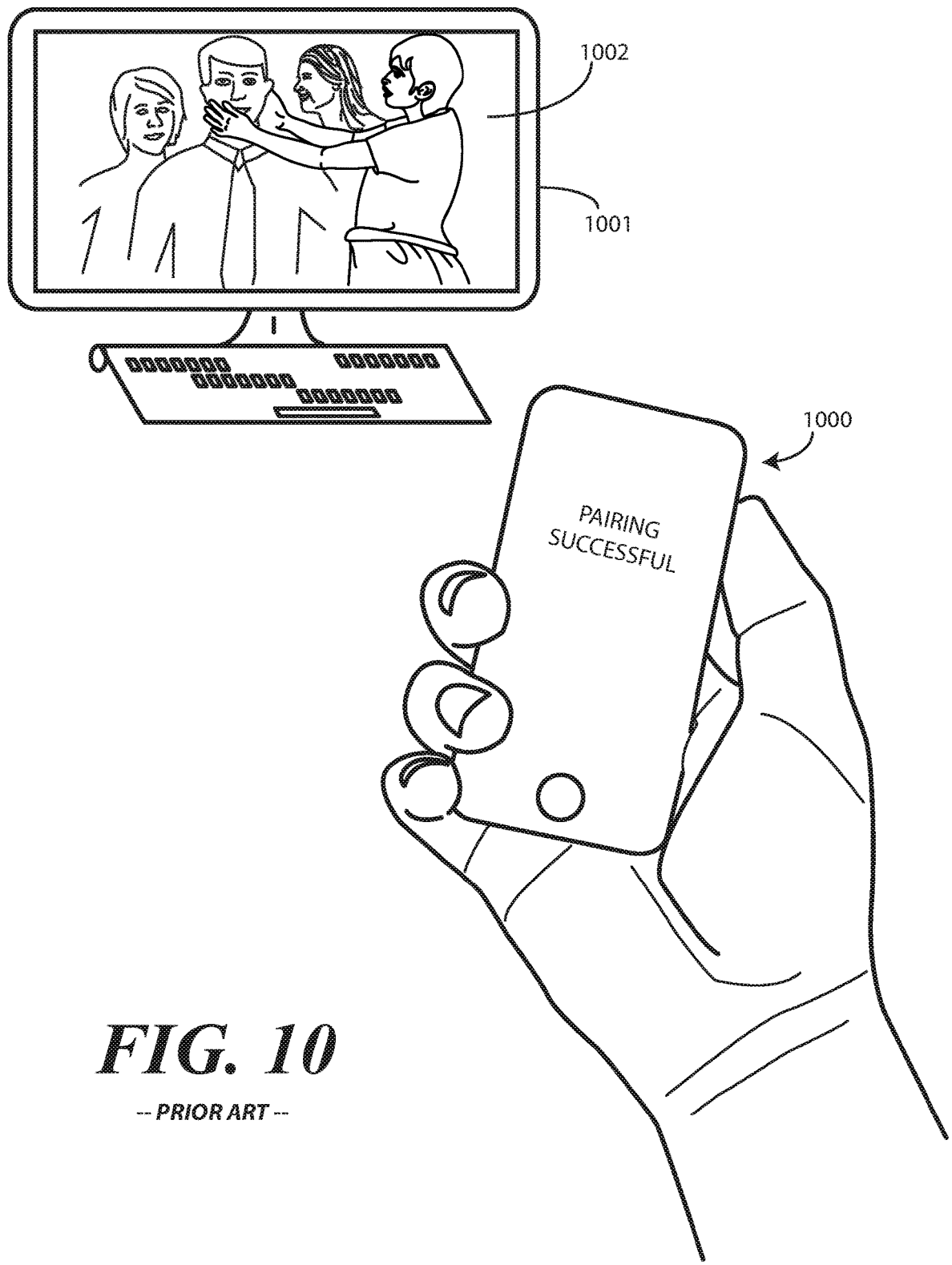
FIG. 10 illustrates one result of the prior art method of FIG. 9.

The output of this pairing session is shown in FIG. 10. Turning now to FIG. 10, a prior art electronic device 1000 is in electronic communication with the content presentation companion device 1001 using a secure communication session (907) established using the data flow of FIG. 9. As shown, this allows a user to access applications, music libraries, video libraries, photo libraries, and files at the prior art electronic device 1000 with output 1002 from the prior art electronic device 1000 being presented on a display 1003 of the content presentation companion device 1001.

Embodiments of the disclosure contemplate that processes such as that shown in FIG. 9 are subject to risk. Illustrating by example, the mstsc.exe file is an executable file. If an executable file is coopted by a malfeasant, malware or other harmful code can be inserted into such an executable file. When a client (902) executes the file at the server (901), the server (901) could be harmed. Some nefarious actors manipulate executable files to create "Trojan horse" files that allow the nefarious actors to access data in a remote device or perform other fiendish actions.

One way that developers have attempted to address this problem is via the use of trusted certificates. A root SSL/TLS certificate is a digital certificate configured as a data file that is issued by a trusted certificate authority. These SSL/TLS certificates help to verify that the server is who it appears to be. This helps to prevent malfeasant actors from inserting a rogue machine between the client and server, known as a "man in the middle," that impersonates the server to the client.

A SSL/TLS certificate includes identifying information about the server. Information in the SSL/TLS certificate from the server can be verified using a chain of "certificate authorities" situated between devices that a client knows to be trustworthy. Any electronic device can generate a signing key and generate a SSL/TLS certificate. However, verification of a received SSL/TLS certificate depends upon the SSL/TLS certificate also being signed by a trusted certificate authority, which is a designated entity created solely to verify a device issuing a SSL/TLS certificate is who they claim to be. While unverified SSL/TLS certificates can easily enable data exchange through a secure communication session, they cannot be used to guarantee the identity of a particular client or server.

For this reason, many devices require that a SSL/TLS certificate be verified as a trusted SSL/TLS certificate. To this end, every electronic device includes a list called a "root store." The root store is a collection of pre-downloaded root certificates, along with the corresponding public key, that are stored in the memory of the electronic device. Sometimes, these root stores are specific to a particular operating system or device manufacturer. Devices manufactured by Apple™ may use a root store defined by that manufacturer, while devices manufactured by Microsoft™ may use a different root store defined by that manufacturer. These root stores define parties that are trusted by the device to verify a SSL/TLS certificate.

To use the trusted verification process in practice, a client receives a SSL/TLS certificate from a server during a handshaking process. The client then checks to see if the SSL/TLS certificate is expired. The client also checks to see if the IP address on the SSL/TLS certificate matches the IP address of the server. The client then looks to its root store to determine if a trusted authority has signed the SSL/TLS certificate received from the server. Due to the breadth of the Internet, it is frequently the case that an authority found in the root store did not sign the SSL/TLS certificate received from the server. Using a series of trusted intermediaries, the client can effectively search a certificate chain starting with the SSL/TLS certificate received from the server that passes through the intermediate certificate authorities to eventually land at a trusted authority found in the root store.

The problem with using SSL/TLS certificate is two fold: first, before a secure communication session can be established, one or both of the client and server must determine whether a received SSL/TLS certificate can be traced back to a trusted authority found in its root store. When trying to merely establish a peer-to-peer secure communication session to simply watch a movie streaming through a smartphone to a television in the privacy of one's home, this process can be computationally intensive and time consuming. Second, and more importantly, the use of trusted SSL/TLS certificates fails to eliminate the man in the middle problem. Malfeasant actors are now coopting SSL/TLS certificates to perpetrate fraud and to step in between client and server to steal information, encrypt devices to extort ransom, or worse. Techniques such as SSL stripping allow a nefarious actor to stand as a man in the middle between a client and server to create all sorts of mischief.

Advantageously, embodiments of the disclosure work to reduce or eliminate this man in the middle problem by enhancing the security mechanisms employed by a client and server during the initiation and establishment of a secure communication session. In one or more embodiments, client SSL/TLS certificate verification is required at the server when a client device generates a unique, self-signed SSL/TLS certificate for each secure communication session. In one or more embodiments, the generation of the unique, self-signed SSL/TLS certificate occurs without communication with, or engagement or utilization of, a certificate authority. The client then embeds the SSL/TLS certificate into the fingerprint of a QR code. The server then authenticates and verifies the client by securely checking its client SSL/TLS certificate during the TLS handshaking process.

On the client side, verification and authentication of the server is also required during the initiation and establishment of a secure communication session. In one or more embodiments, this occurs when the server TLS certificate hash is transmitted to the client, with that TLS certificate hash being encrypted with a session key derived, optionally using the J-PAKE protocol method or another similar technique, from the randomly generated password or primary key found in the QR code.

By requiring verification at both client and server, and by encrypting a TLS server hash using a session key derived from the randomly generated password or primary key found in the QR code, a mutual authentication process utilizes an out of band pairing process where, for example, information such as the password or primary key is received by a server from a prospective client device seeking to establish a secure communication session the server via a first medium of communication such as an optical scan occurring in an optical communication channel while other information such as a client certificate is received by the server from a remote electronic device using a second medium of communication such as a wireless radio communication channel that allows the server to confirm that the password or primary key and client certificate were received from the same device, thereby confirming there is no man in the middle. A similar verification can occur at the client side.

Advantageously, embodiments of the disclosure provide a mutual client-server authentication process using an out of band pairing operation along with a TLS protocol that does not require the involvement of any certificate authority or root certificate store. To the contrary, client and server can generate and sign their own certificates, allowing the other to verify the same and confirm that there is no man in the middle, without any need to use a trusted server or trusted certificate authority in the verification process.

It should be noted that while the TLS protocol is used in conjunction with the out of band techniques described below, other key verification protocols and techniques that could be substituted for the TLS protocol will be obvious to those of ordinary skill in the art having the benefit of this disclosure. However, TLS is used as an illustrative example due to the fact that the TLS protocol is widely used to establish secure communication sessions and is well suited for use with certificate verification processes. While other protocols and techniques can be substituted for TLS, such a replacement may be associated with increase development and maintenance costs as well as increased chances for bugs and other implementation defects.

In one or more embodiments, an electronic device configured as a server receives, with a first communication device, from a prospective client device seeking to establish a secure communication session with the electronic device, client information via a first medium of communication. In one or more embodiments, the client information includes a password or primary key, and can include a client IP address, client certificate digest, or other information. In one or more embodiments, the first medium of communication comprises an optical communication channel. For example, the electronic device can receive the client information by scanning a QR code in one or more embodiments. This first medium of communication defines the "out of band" operation for embodiments of the disclosure, as the remaining operations occur via a second medium of communication in one or more embodiments.

For instance, the electronic device can then receive a client certificate from a remote electronic device via a second medium of communication that is different from the first medium of communication. In one or more embodiments, the second medium of communication comprises a wireless radio communication channel where data is received via the transmission of radio frequency electromagnetic signals.

In one or more embodiments, the electronic device can then verify that the prospective client device and the remote electronic device are the same device. Illustrating by example, the electronic device can authenticate that the remote electronic device transmitting the client certificate by decrypting the client certificate using a derived decryption key based upon the password or primary key received from the prospective client device in the QR code scan to verify that there is no man in the middle and that the password or primary code and client certificate were received from the same device. The electronic device can then establish the secure communication session.

A similar verification can occur at the client. In one or more embodiments, a client generates a visible representation comprising a primary key or password, and optionally an IP address and a client certificate digest. The client can then present the visible representation on a display. From there, the client can generate a client certificate for transmission to a remote electronic device. The client can use a decryption key derived from the primary key or password presented in the visible representation to decrypt the TLS server digest. Where successful decryption occurs, the client is able to verify that the device reading the visible representation and the device transmitting the encrypted TLS server has are the same device. This verification at each device occurs without the need to communicate with any trusted certificate authority or trusted intermediary authority. Said differently, this verification occurs without utilization of a certificate authority or a root certificate store. Other advantages offered by embodiments of the disclosure will be obvious to those of ordinary skill in the art having the benefit of this disclosure.

Figure 2:
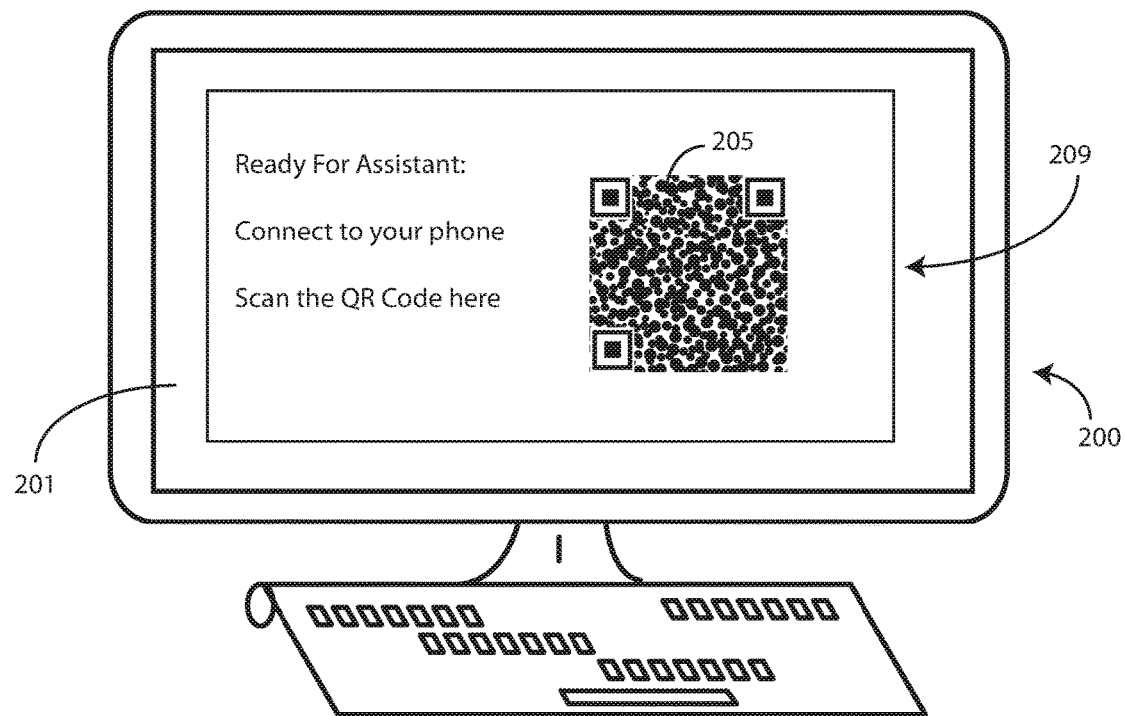
FIG. 2 illustrates another explanatory electronic device in accordance with one or more embodiments of the disclosure.
Figure 2:
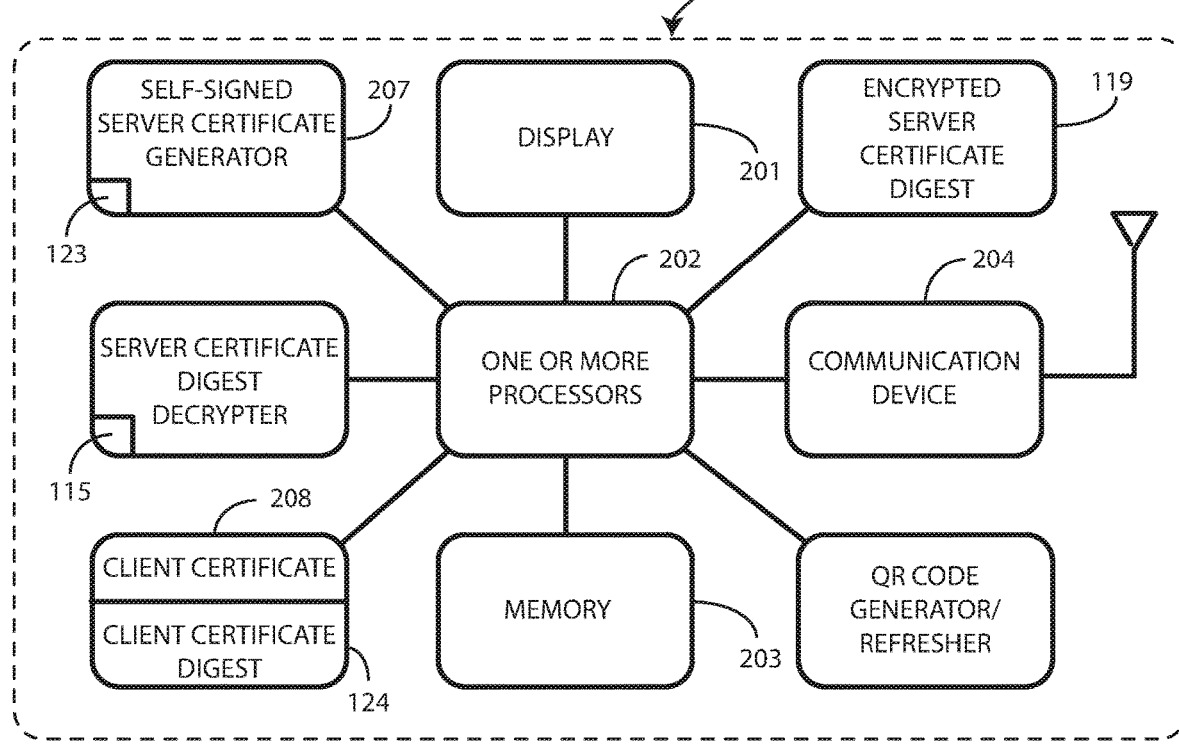

Turning now to FIG. 1, illustrated therein is one explanatory electronic device 100 configured in accordance with one or more embodiments of the disclosure. The electronic device 100 of FIG. 2 is a portable electronic device and is shown as a smartphone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 101, which may optionally be touch-sensitive. Users can deliver user input to the display 101, which serves as a user interface for the electronic device 100. In one embodiment, users can deliver user input to the display 101 of such an embodiment by delivering touch input from a finger, stylus, or other objects disposed proximately with the display 101. In one embodiment, the display 101 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 also includes a device housing 102. In one embodiment, the device housing 102 includes two housing members, namely, a first device housing 103 that is coupled to a second device housing 104 by a hinge 105 such that the first device housing 103 is pivotable about the hinge 105 relative to the second device housing 104 between a closed position and an axially displaced open position. In other embodiments, the device housing 102 will be rigid and will include no hinge. In still other embodiments, the device housing 102 will be manufactured from a flexible material such that it can be bent and deformed. Where the device housing 102 is manufactured from a flexible material or where the device housing 102 includes a hinge, the display 101 can be manufactured on a flexible substrate such that it bends. In one or more embodiments, the display 101 is configured as a flexible display that is coupled to the first device housing 103 and the second device housing 104, spanning the hinge 105. Features can be incorporated into the device housing 102, including control devices, connectors, and so forth.

Also shown in FIG. 1 is an explanatory block diagram schematic 106 of the explanatory electronic device 100. In one or more embodiments, the block diagram schematic 106 is configured as a printed circuit board assembly disposed within the device housing 102 of the electronic device 100. Various components can be electrically coupled together by conductors or a bus disposed along one or more printed circuit boards.

The illustrative block diagram schematic 106 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

In one embodiment, the electronic device includes one or more processors 107. In one embodiment, the one or more processors 107 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 106. Each of the application processor and the auxiliary processor(s) can be configured to process and execute executable software code to perform the various functions of the electronic device with which the block diagram schematic 106 operates. A storage device, such as memory 108, can optionally store the executable software code used by the one or more processors 107 during operation.

In this illustrative embodiment, the block diagram schematic 106 also includes a communication device 109 that can be configured for wired or wireless communication with one or more other devices or networks. The networks can include a wide area network, a local area network, and/or personal area network. The communication device 109 may also utilize wireless technology for communication, such as, but are not limited to, peer-to-peer or ad hoc communications such as HomeRF, Bluetooth and IEEE 802.11, and other forms of wireless communication such as infrared technology. The communication device 109 can include wireless communication circuitry, one of a receiver, a transmitter, or transceiver, and one or more antennas 110.

In one embodiment, the one or more processors 107 can be responsible for performing the primary functions of the electronic device with which the block diagram schematic 106 is operational. For example, in one embodiment the one or more processors 107 comprise one or more circuits operable with the display 101 to present presentation information to a user. The executable software code used by the one or more processors 107 can be configured as one or more modules 111 that are operable with the one or more processors 107. Such modules 111 can store instructions, control algorithms, and so forth.

Various sensors 118 can be operable with the one or more processors 107. One example of a sensor that can be included with the various sensors 118 is a touch sensor. Another example of a sensor that can be included with the various sensors 118 is a geo-locator that serves as a location detector. In one embodiment, location detector is able to determine location data when authenticating a user. Another example of a sensor that can be included with the various sensors 118 is an orientation detector operable to determine an orientation and/or movement of the electronic device 100 in three-dimensional space. Illustrating by example, the orientation detector can include an accelerometer, gyroscopes, or other device to detect device orientation and/or motion of the electronic device 100.

An identification system 117 can be operable with the one or more processors 107. A first identifier of the identification system 117 can include an imager 116. In one embodiment, the imager 116 comprises a two-dimensional imager configured to receive at least one image of a person, an object, or other item situated within an environment of the electronic device 100. In one embodiment, the imager 116 comprises a two-dimensional RGB imager. In another embodiment, the imager 116 comprises an infrared imager. Other types of imagers suitable for use as the imager 116 of the identification system 117 will be obvious to those of ordinary skill in the art having the benefit of this disclosure. The identification system 117 can be configured to process an image or depth scan of an object and determine whether the object matches predetermined criteria by comparing the image or depth scan to one or more predefined identification references stored in memory 108.

For example, the identification system 117 can operate as an identification module configured with optical and/or spatial recognition to identify objects using image recognition, character recognition, visual recognition, facial recognition, color recognition, shape recognition, and the like. Advantageously, the identification system 117 can be used as a facial recognition device to determine the identity of one or more persons detected within the environment of the electronic device 100.

The identification system 117 and imager 116 can work in tandem to define a QR code reader 112. Alternatively, the electronic device 100 can include a separate QR code reader. The QR code reader 112 can scan matrix barcodes containing information represented in the matrix relating to a particular item, device, or object. Illustrating by example, when the electronic device 100 is operating as a server in communication with a client using a secure communication session, the client may present a QR code containing certain information pertaining to the client that the one or more processors 107 can obtain by scanning the QR code with the QR code reader. Examples of this information include an IP address of the client device, a client certificate digest, a password or primary key, or other information.

In one or more embodiments the QR code reader 112 and the communication device 109 operate using different media of communications. One can be operable across a first medium of communication, while the other can be operable across a second medium of communication. The QR code reader 112, for example, can be configured as an optical communication device configured to scan QR codes optically using an optical communication channel. The communication device 109, by contrast, can be configured as a wireless radio communication device that communicates with other electronic devices using data modulated into radio frequency electromagnetic waves transmitted and received by the one or more antennas 110 using a wireless radio communication channel. As will be explained below, by using both the QR code reader 112 and the communication device 109 when establishing a secure communication session, each of which gathers information from other devices via media of communication that are different, an out of band secure communication session establishment method can be performed that allows each of a client and server to verify self-signed SSL/TLS certificates created independently in each device without any contact with, or utilization of, a certificate authority or a root certificate store.

Other components 129 operable with the one or more processors 107 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The one or more processors 107 can be configured to operate in conjunction with the various components shown in the block diagram schematic 106 to perform various functions. Illustrating by example, the one or more processors can be operable with the communication device 109 and the QR code reader 112 to obtain information through a first medium of communication and a second medium of communication, respectively, and can use that information to verify that the information received from the first medium of communication and the second medium of communication came from the same device.

In one or more embodiments, the one or more processors 107 receive, with the QR code reader 112 from a prospective client device seeking to establish a secure communication session with the electronic device 100, client information via an optical communication channel. This information may include a password or primary key 115, an IP address associated with the prospective client device, a client certificate digest 124, or other information. The one or more processors 107 may then receive, with the communication device 109 from a remote electronic device via a wireless radio communication channel, a client certificate 120. The one or more processors 107 may then verify that the prospective client device presenting the QR code and the remote electronic device delivering the client certificate 120 are the same device.

If, for example, the QR code scanned by the QR code reader 112 includes the IP address of the prospective client device, the one or more processors 107 can compare the IP address of the prospective client device with the IP address found in the client certificate 120 received by the communication device 109. Where they are the same, the one or more processors 107 can conclude that the prospective client device delivering the client information via the first medium of communication and the remote electronic device delivering the client certificate 120 via the second medium of communication are the same device. Accordingly, the one or more processors 107 can establish a secure communication session with this device using the communication device 109 via the one or more antennas 110.

Accordingly, in one or more embodiments the one or more processors 107 are operable with a first communication device, e.g., the QR code reader 112, and a second communication device, e.g., the communication device 109 that communicates using the one or more antennas 110. The one or more processors 107 can obtain a password or primary key 115, IP address, client certificate digest 124, or other information from a prospective client device using the first communication device. Thereafter the one or more processors 107 can receive a client certificate 120 from a remote electronic device using the second communication device. The one or more processors 107 can verify that the prospective client device and the remote electronic device are the same device by determining whether the client certificate 120 includes information from the client certificate digest 124, one example of which is the IP address.

The one or more processors 107 can perform other operations as well that allow the client device to verify the electronic device 100 as a trusted server, and one that will establish a secure communication session without fear of man in the middle interference. Illustrating by example, when the QR code presented on the display of the prospective client device and scanned by the QR code reader 112 includes a password or primary key 115, the one or more processors 107 can derive a shared key 121 from the password or primary key 115. After a self-signed server certificate generator 122 generates a self-signed SSL/TLS server certificate 123, the one or more processors 107 can encrypt a sever certificate digest 119 hashed from the SSL/TLS server certificate 123 using the shared key 121 derived from the password or primary key 115. The one or more processors 107 can then cause the communication device 109 to use the one or more antennas 110 to transfer the encrypted server certificate digest to the prospective client device. Since the prospective client device knows the password or primary key it included with the QR code presented on its display, it can independently derive the shared key using the password or primary key. The prospective client device can then attempt to decrypt the encrypted server certificate digest using the independently derived shared key. Where this decryption is successful, the client device knows that the electronic device reading the QR code presented on its display, here the electronic device 100, is the same device as the one transmitting the encrypted server certificate digest due to the fact that the encrypted server certificate digest was encrypted with the password or primary key presented in the QR code.

Turning now to FIG. 2, illustrated therein is another electronic device 200 configured in accordance with one or more embodiments of the disclosure. The electronic device 200 is configured as a computer, but could be configured as any number of other electronic devices. Illustrating by example, the electronic device 200 could alternatively be a television, a computer monitor, a laptop display, a tablet computer, or a projector projecting content onto a screen. Other examples of electronic devices will be obvious to those of ordinary skill in the art having the benefit of this disclosure. For illustration purposes, the electronic device 200 will be considered to be a content presentation companion device for the electronic device (100) of FIG. 1 due to the fact that the electronic device 200 can operate as a client device to establish a secure communication session with the electronic device (100) using the methods described herein to present content received from the electronic device (100) using its larger display 201.

Regardless of configuration, in one or more embodiments the electronic device 200 includes one or more processors 202, a display 201, a memory 203, and a communication device 204 capable of wired or wireless communication with an electronic device such as the electronic device (100) of FIG. 1. In one or more embodiments, when coupled by either a wireless or wired connection to such an electronic device (100), the electronic device 200 can function as a primary display and/or user input for the electronic device (100). The electronic device (100) can, for example, receive content from a terrestrial broadcast network, cable television network, Internet streaming service, or combinations thereof, and redirect this content to the display 201 of the electronic device 200 since the display 201 is larger than the display (101) of the electronic device (100). This allows people within the environment of the electronic device (100) and/or the electronic device 200 to more easily see the content. In one or more embodiments, content flows from the electronic device (100) to the electronic device 200 through the communication device 204 after a secure communication session has been established.

In one or more embodiments, the one or more processors 202 generate a self-signed, unique client certificate 120 for each secure communication session. In one or more embodiments, the generation of the unique, self-signed SSL/TLS server certificate 123 occurs without communication with, or engagement or utilization of, a certificate authority.

Illustrating by example, after a self-signed server certificate generator 207 generates a self-signed SSL/TLS server certificate 123 for the electronic device 200, the one or more processors 202 can encrypt a client certificate digest 124 hashed from the SSL/TLS server certificate 123 using a shared key 121 derived from the password or primary key 115.

In one or more embodiments, the one or more processors 202 of the electronic device 200 can initiate the establishment of the secure communication session by generating a visible representation 209 that includes embedded therein information relating to the electronic device 200. In the illustrative embodiment of FIG. 2, the visible representation 209 comprises a QR code. The information encoded in the QR code can include a client certificate digest 124, a password or primary key 115 that may be generated randomly on a per session basis, an IP address of the electronic device 200 or other information. In one or more embodiments, the one or more processors 202 present the visible representation on the display 201. Upon receiving a client certificate request from a prospective server, the one or more processors 202 can cause the communication device 204 to transmit the unique, self-signed SSL/TLS server certificate 123 to the prospective server.

In one or more embodiments, after presenting the QR code on the display 201, the one or more processors 202 receive, via the communication device 204, an encrypted server certificate digest 119 from a prospective server. The one or more processors 202 can then verify that the server certificate digest 119 was encrypted with a shared key 121 derived from at least some information presented in the visible representation 209 by attempting to decrypt the encrypted server certificate digest 119 using a locally and independently derived shared key 121. If the decryption is successful, the one or more processors 202 know that the electronic device reading the QR code presented on its display 201 is the same device as the one transmitting the encrypted server certificate digest 119 due to the fact that the encrypted server certificate digest 119 was encrypted with the password or primary key 115 presented in the QR code. In one or more embodiments, this verification performed by the one or more processors 202 occurs without utilization of a certificate authority or a root certificate store.

It is to be understood that in both FIG. 1 and FIG. 2, the elements illustrated are provided for illustrative purposes only in accordance with embodiments of the disclosure. Neither is intended to be a complete schematic diagram of the various components required. Therefore, other electronic devices in accordance with embodiments of the disclosure may include various other components obvious to those of ordinary skill in the art having the benefit of this disclosure, but not shown in FIG. 1 or FIG. 2, or may include a combination of two or more components or a division of a particular component into two or more separate components, and still be within the scope of the present disclosure.

Figure 3:
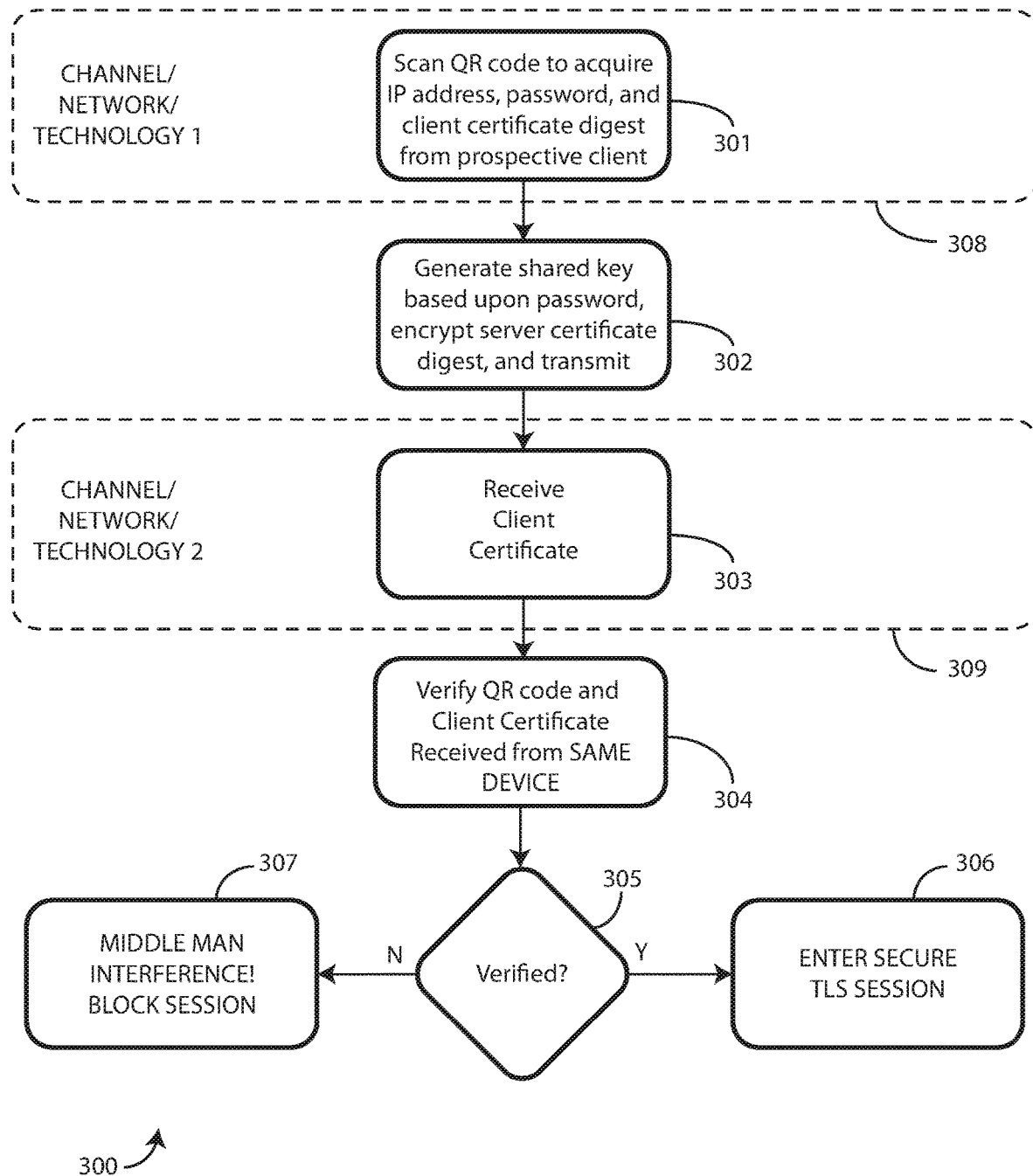
FIG. 3 illustrates one explanatory method in accordance with one or more embodiments of the disclosure.

Turning now to FIG. 3, illustrated therein is one explanatory method 300 suitable for use in a server device configured in accordance with one or more embodiments of the disclosure. Beginning at step 301, the server device receives, with a first communication device from a prospective client device, client information via a first medium of communication 308. In one or more embodiments, the first medium of communication comprises an optical communication channel. In one or more embodiments, step 301 comprises receiving the client information via the first medium of communication 308 by scanning a QR code presented on a display of the prospective client device. In one or more embodiments, the QR code includes information such as one or more of an IP address of the prospective client device, a password or primary key, and/or a client certificate digest.

At step 302, the server device derives a shared key based upon the password or primary key. This derivation can be performed in accordance with a protocol that is standardized and common in both the server device and the client device. In one or more embodiments, step 302 also comprises the server device generating a unique, self-signed SSL/TLS certificate and creating a SSL/TLS certificate digest by performing a hash operation on the SSL/TLS certificate. Since the shared key has been derived from the password or primary key, in one or more embodiments step 302 comprises the server device encrypting the SSL/TLS certificate digest using the shared key and transmitting the encrypted SSL/TLS certificate digest to the prospective client device. Step 302 can optionally include transmitting a client certificate request to the prospective client device as well.

At step 303, the server device receives, with a second communication device from a remote electronic device via a second medium of communication 309 that is different from the first medium of communication 308, a client certificate. In one or more embodiments, the second medium of communication comprises a wireless radio communication channel. In one or more embodiments, the client certificate includes information pertaining to the client certificate, including the IP address of the client device.

At step 304, the server device verifies that the prospective client device from which the QR code was scanned via the first medium of communication 308 and the remote electronic device from which the client certificate was received via the second medium of communication 309 are the same device. In one or more embodiments, where the client device has embedded a fingerprint of the client certificate in the QR code scanned at step 301, the server device can authenticate the client device securely by checking its client certificate to verify that at least some information present in the QR code is also represented in the client certificate.

Decision 305 determines whether the verification was successful. Where it is, step 306 comprises the server device establishing a secure communication session with the prospective client device when the prospective client device and the remote electronic device are verified as being the same device. Step 307 comprises precluding establishment of the secure communication session when the prospective client device and the remote electronic device are determined to be different devices. In one or more embodiments, the method 300 of FIG. 3 occurs without the utilization of a certificate of authority and without the use of a root certificate store. In one or more embodiments, the method 300 of FIG. 3 ensures that no man in the middle is situated between the client device and the server device. As the first medium of communication 308 is different from the second medium of communication 309, step 301 occurs "out of band" relative to the remaining steps. Moreover, the method 300 of FIG. 3 allows the use of a TLS protocol in steps 302-304 without relying upon a certificate authority or root certificate store. Other advantages offered by the method of FIG. 3 will be obvious to those of ordinary skill in the art having the benefit of this disclosure.

Figure 4:
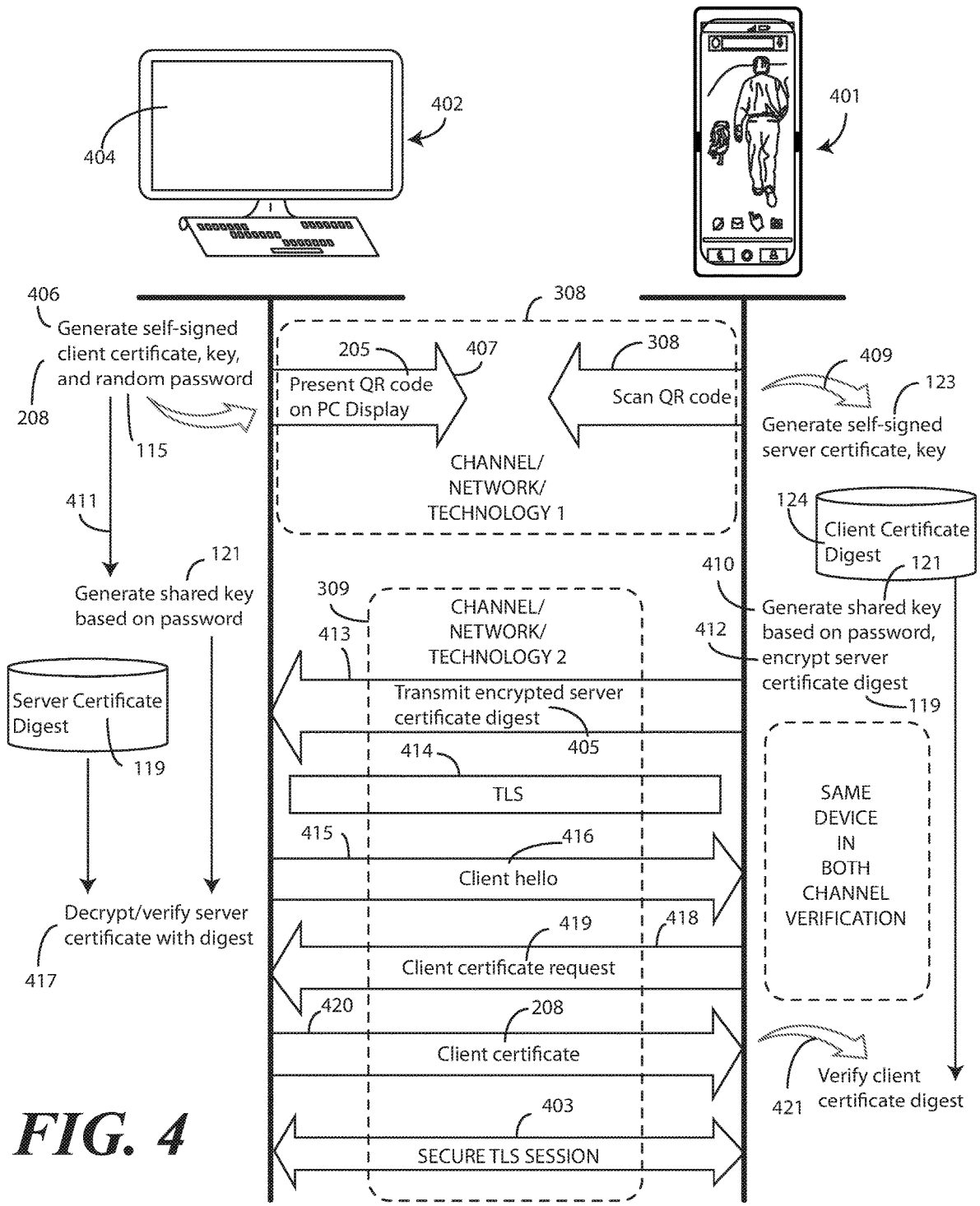
FIG. 4 illustrates one explanatory data flow diagram in accordance with one or more embodiments of the disclosure.

Turning now to FIG. 4, illustrated therein is one explanatory data flow diagram illustrating both client device operations and server device operations in accordance with one or more embodiments of the disclosure. The data flow allows a server device 401 to perform a verification of the client certificate 208 when the client device 402 generates a unique, self-signed client certificate 208 for each secure communication session 403. In one or more embodiments, the client device 402 embeds a client certificate fingerprint in a QR code 205 presented on a display 404 of the client device 402. The server device 401 can then authenticate the client device 402 securely by checking the client certificate 208 during the TLS handshake process. Similarly, the client device can verify the server device 401 by hashing the SSL/TLS server certificate 123 to create a server certificate digest 119 that is encrypted and transmitted to the client device 402. In one or more embodiments, the client device 402 decrypts the encrypted server certificate digest 405 using a shared key 121 derived from a password or primary key 115 generated by the client device 402 and embedded in the QR code 205 initially presented on the display 404 of the client device 402. The shared key 121 may be derived from the password or primary key 115 using the J-PAKE protocol method or another similar technique.

Initially, the client device 402 generates a unique, self-signed client certificate 208. In one or more embodiments, the client device 402 generates this unique, self-signed client certificate 208 without utilization of a certificate authority or a root certificate store.

In one or more embodiments, the client device 402 then generates 406 a visible representation for presentation on its display 404. In one or more embodiments, the visible representation generated is a QR code 205, which the client device 402 and presents 407 on its display 404.

In one or more embodiments, the QR code 205 encodes one or more pieces of information relating to the client device 402. Illustrating by example, in one or more embodiments the QR code 205 encodes an IP address of the client device. In one or more embodiments, the QR code 205 encodes a client certificate digest 124, which is a hash of the unique, self-signed client certificate 208. In one or more embodiments, the QR code 205 encodes a password or primary key 115. Of course, combinations of this information may be encoded in the QR code 205.

In one explanatory embodiment, the client device 402 encodes the client certificate digest 124, the IP address of the client device 402, and the password or primary key 115. In one or more embodiments, the password or primary key 115 is generated randomly in the client device 402 on a per-session basis. Thus, each time the client device 402 wishes to establish a secure communication session 403 with a server device 401, it generates a new password or primary key 115. It can also generate a new unique, self-signed client certificate 208 on a per session basis as well. Doing either will result in the QR code 205 being uniquely generated on a per session basis.

The server device 401 then receives 408, using a first communication device operable in a first medium of communication 308, the information from the QR code 205 from the client device 402, which at this point is a prospective client device because there has been no verification or establishment of any secure communication session 403. In one or more embodiments, the first communication device comprises a QR code reader that receives the information via an optical communication channel.

The server device 401 generates 409, optionally in response to scanning the QR code 205, a unique, self-signed server certificate 123. In one or more embodiments, the server device 401 generates this unique, self-signed server certificate 123 without utilization of a certificate authority or a root certificate store. The server device 401 can further hash the unique, self-signed server certificate 123 to create a server certificate digest 119.

The server device 401 then derives 410 a shared key 121 from the password or primary key 115 encoded in the QR code 205 and received by the QR code reader. The client device 402, having generated the password or primary key 115, also generates 411 the shared key 121, as the same key generation method is coded into the server device 401 and the client device 402.

The server device 401 can then encrypt 412 the server certificate digest 119 using the shared key 121 to create an encrypted server certificate digest 405. The server device 401 transmits 413 the encrypted server certificate digest 405 to the client device 402. A TLS handshaking process 414 can then begin, with the client device 402 transmitting 415 a client hello 416 in response to receiving the encrypted server certificate digest 405.

In the background, the client device 402 attempts to decrypt 417 the encrypted server certificate digest 405 using the shared key 121. If the decryption 417 is successful, the client device 402 is assured that the encrypted server certificate digest 405 received by the second medium of communication 309, which is a wireless radio communication channel in this illustration, was encrypted by the same device that received the QR code 205 via the first medium of communication 308. Accordingly, the client device 402 verifies the server device 401 using a self-signed server certificate 123 without utilization of a certificate authority or a root certificate store.

The server device 401 then transmits 418 a client certificate request 419 to the client device 402. The client device 402 then transmits 420, in response to the client certificate request 419, the client certificate 208.

The server device 401 can then verify 421 that the prospective client device from which the information in the QR code 205 was received using the first medium of communication 308 and the remote electronic device transmitting the client certificate 208 using the second medium of communication 309 are the same device by comparing information received from the QR code 205 to information found in the client certificate 208. Illustrating by example, if the QR code 205 includes a client certificate digest 124 or other certificate fingerprint, the server device 401 can compare this information to that found in the client certificate 208. If the QR code 205 includes an IP address of the client device 402, the server device 401 can compare this IP address to that found in the client certificate 208, and so forth. Other techniques for comparing the information in the QR code 205 to the information found in the client certificate 208 will be obvious to those of ordinary skill in the art having the benefit of this disclosure. In one or more embodiments, this verification 421 occurs without the utilization of a certificate authority or root certificate store.

Once the client device 402 has verified the server device 401, and the server device 401 has verified the client device 402, a secure communication session 403 can be established between the two devices. Otherwise the server device 401 can preclude establishment of the secure communication session 403 when the remote electronic device and the prospective client device are determined to be different devices, e.g., when the QR code 205 and the client certificate 208 are received from different devices.

Accordingly, the method steps illustrated in FIG. 4 provide a mutual authentication and verification process for both a client device 402 and a server device 401 based upon a password or primary key 115 shared in an out of band communication channel allowing the client device 402 and server device 401 to each verify the other in a TLS protocol exchange occurring in an in band communication channel without relying on a certificate authority or root certificate store. Additionally, the steps shown in FIG. 4 ensure that there is no "man in the middle" situated between the client device 402 and the server device 401.

Figure 5:
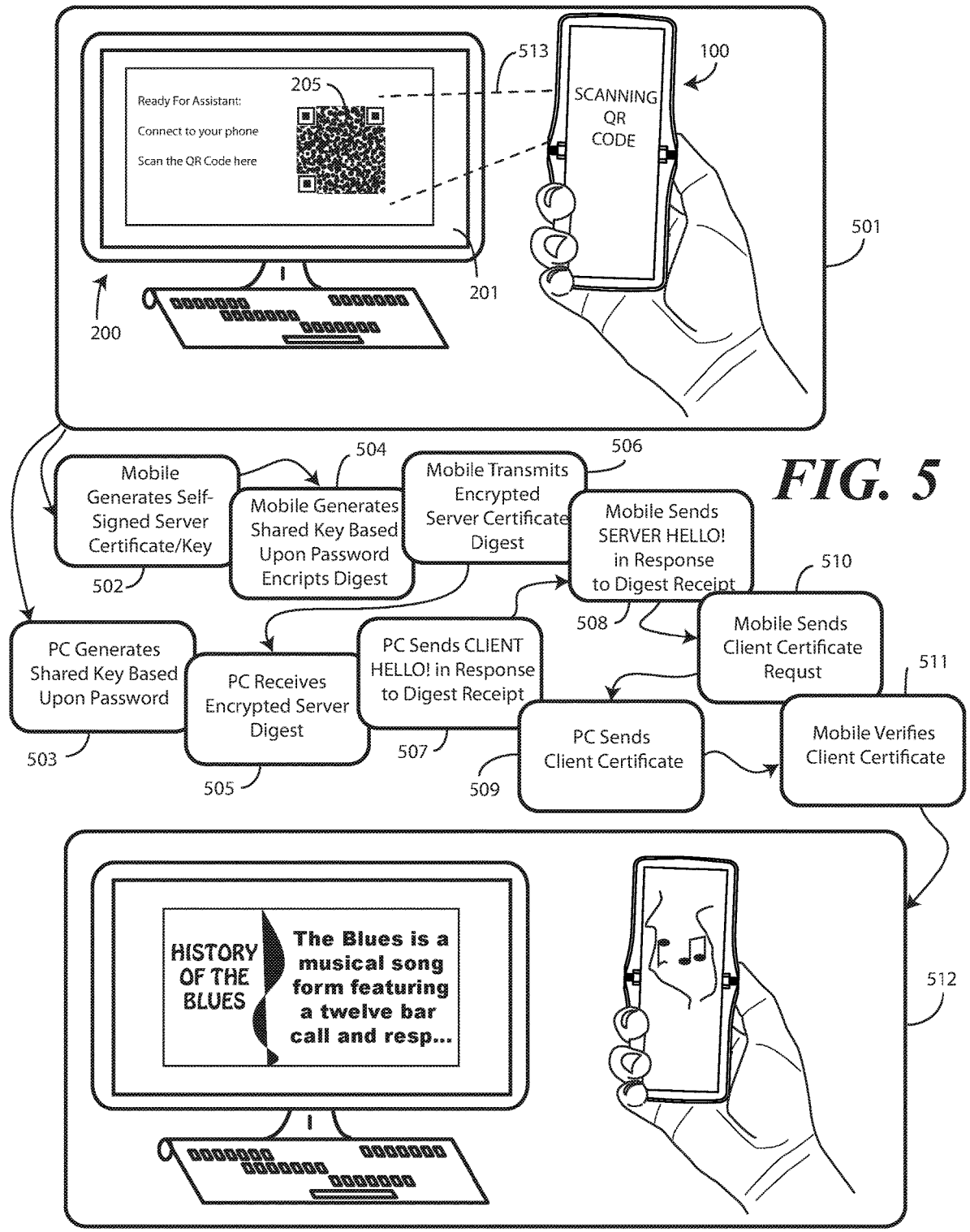
FIG. 5 illustrates one or more method steps in accordance with one or more embodiments of the disclosure.

The method described with reference to FIG. 4 is illustrated in FIG. 5. Turning now to FIG. 5, at step 501 an electronic device 100 receives 513, with a first communication device from another electronic device 200 seeking to establish a secure communication session with the electronic device 100 and initially operating as a prospective client device for the electronic device 100, client information via a first medium of communication. At step 501, the first medium of communication comprises an optical communication channel, with the receipt 513 of the client information comprising a scan of a QR code 205 presented on a display 201 of the other electronic device 200. As previously described, in one or more embodiments the QR code 205 has embedded therein a password or primary key. The QR code 205 can additionally have one or both of an IP address and/or a client certificate digest embedded or encoded therein as well.

At step 502, the electronic device 100 generates a self-signed server certificate. At step 504, the electronic device 100 derives a shared key from the password or the primary key obtained from the QR code 205, creates a server certificate digest from the self-signed server certificate, and encrypts the server certificate digest with the shared key. Said differently, at step 504 the electronic device 100 encrypts a server certificate digest using an encryption key derived from information obtained from the QR code 205 and uses the second communication device to transmit the server certificate digest to the remote electronic device after encryption. At step 506, the electronic device 100 transmits the server certificate digest to the other electronic device 200. At optional step 508, the electronic device 100 can send a server hello to the electronic device 200 identified from the information gleaned from the QR code 205 as well.

The other electronic device 200 performs similar operations. At step 503, the other electronic device 200 derives the shared key from the password or primary key it generated and encoded into the QR code 205. In one or more embodiments, the shared key derived at step 503 is the same shared key that is derived by the electronic device 100 at step 504 due to the fact that both the electronic device 100 and the other electronic device 200 use the same shared key derivation technique and same password or primary key.

At step 505, the other electronic device 200 receives the encrypted server certificate digest. At step 507, the other electronic device 200 optionally transmits a client hello message to the electronic device 100.

At step 510, the electronic device 100 transmits a client certificate request. In one or more embodiments, step 510 comprises one or more processors of the electronic device 100 to cause the second communication device to transmit a client certificate request to the other electronic device 200. At step 509, the other electronic device 200 transmits the client certificate. The electronic device 100 receives the client certificate from the other electronic device 200 in response to the client certificate request. In one or more embodiments, the electronic device 100 receives the client certificate with a second communication device via a second medium of communication that is different from the first medium of communication. In one or more embodiments, the second medium of communication comprises a wireless radio communication channel.

At step 511, the electronic device 100 and the other electronic device 200 verify their respectively received information. Illustrating by example, the electronic device 100 verifies that the device from which the information in the QR code 205 was received and the device from which the client certificate was received are the same device. This step 511 can include determining whether the client certificate includes information found in the client certificate digest. This step 511 can also include determining whether the client certificate includes at least some of the client information obtained from the QR code 205.

The other electronic device 200 performs similar verification operations at step 511. Illustrating by example, the other electronic device 200 can verify the electronic device 100 by determining that the server certificate digest was encrypted with the encryption key derived from at least some information presented in the QR code 205, e.g., the password or primary key. In one or more embodiments, the verification operations in both the electronic device 100 and the other electronic device 200 occurring at step 511 occur without utilization of a certificate authority or a root certificate store.

At step 512, the electronic device 100 establishes a secure communication session with the other electronic device 200. In one or more embodiments, this establishment of the secure communication session occurs only when the electronic device 100 verifies that the information obtained from the QR code 205 using the first medium of communication was obtained from the same device that supplied the client certificate using the second medium of communication. In one or more embodiments, this establishment of the secure communication session occurs only when the other electronic device 200 verifies that the server certificate digest was encrypted with a shared key derived from the password or primary key embedded in the QR code 205. Otherwise, one or both devices will preclude the establishment of the secure communication session due to the fact that a man in the middle appears to be acting nefariously.

Figure 6:
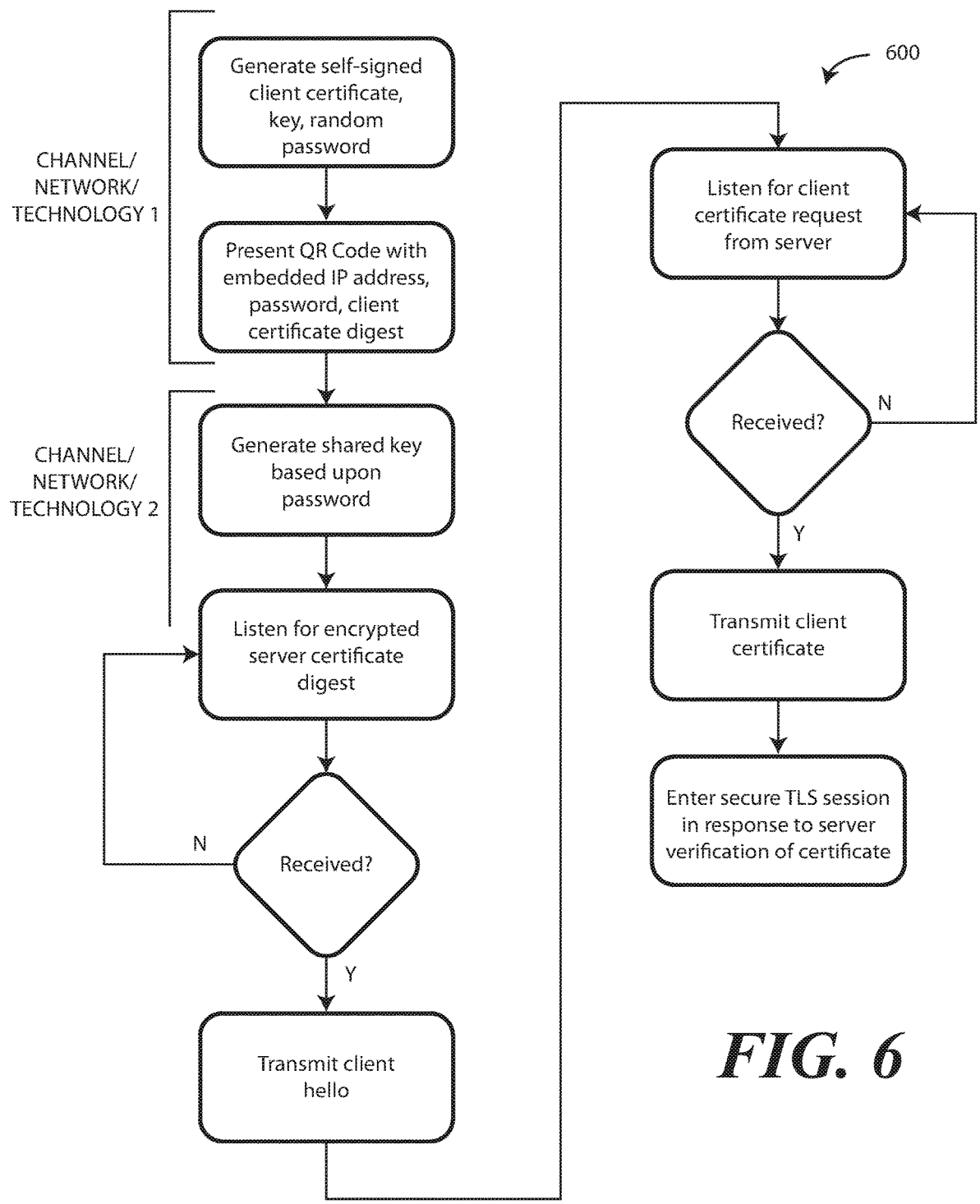
FIG. 6 illustrates another explanatory method in accordance with one or more embodiments of the disclosure.
Figure 7:
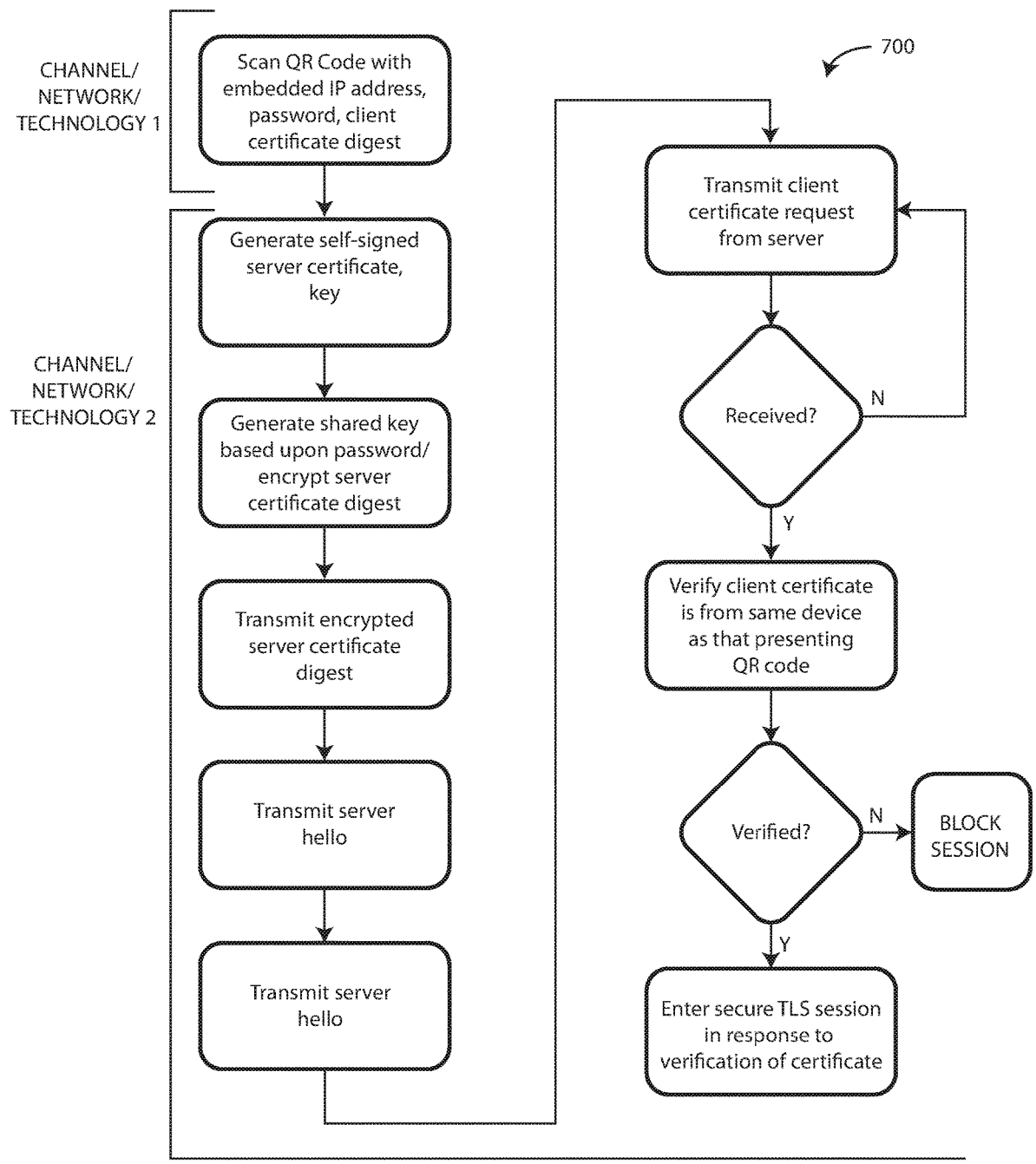
FIG. 7 illustrates yet another explanatory method in accordance with one or more embodiments of the disclosure.

The steps of FIGS. 4-5 are shown as interactions between two devices. For clarity, these steps are separated in FIGS. 6-7. FIG. 6 illustrates one explanatory method 600 for a client device, while FIG. 7 illustrates one explanatory method 700 for a server device. Since the method steps shown in the method 600 of FIG. 6 and the method 700 of FIG. 7 have been described in sufficient detail above, they will not be repeated here in the interest of brevity. Given the preceding discussion, it is expected that one of ordinary skill, notwithstanding possibly significant effort and many design choices motivated by, for example, available time, current technology, and economic considerations, when guided by the concepts and principles disclosed in FIGS. 6-7 will be readily capable of generating software instructions and programs to implement the methods 600,700 shown therein with minimal experimentation.

Figure 8:
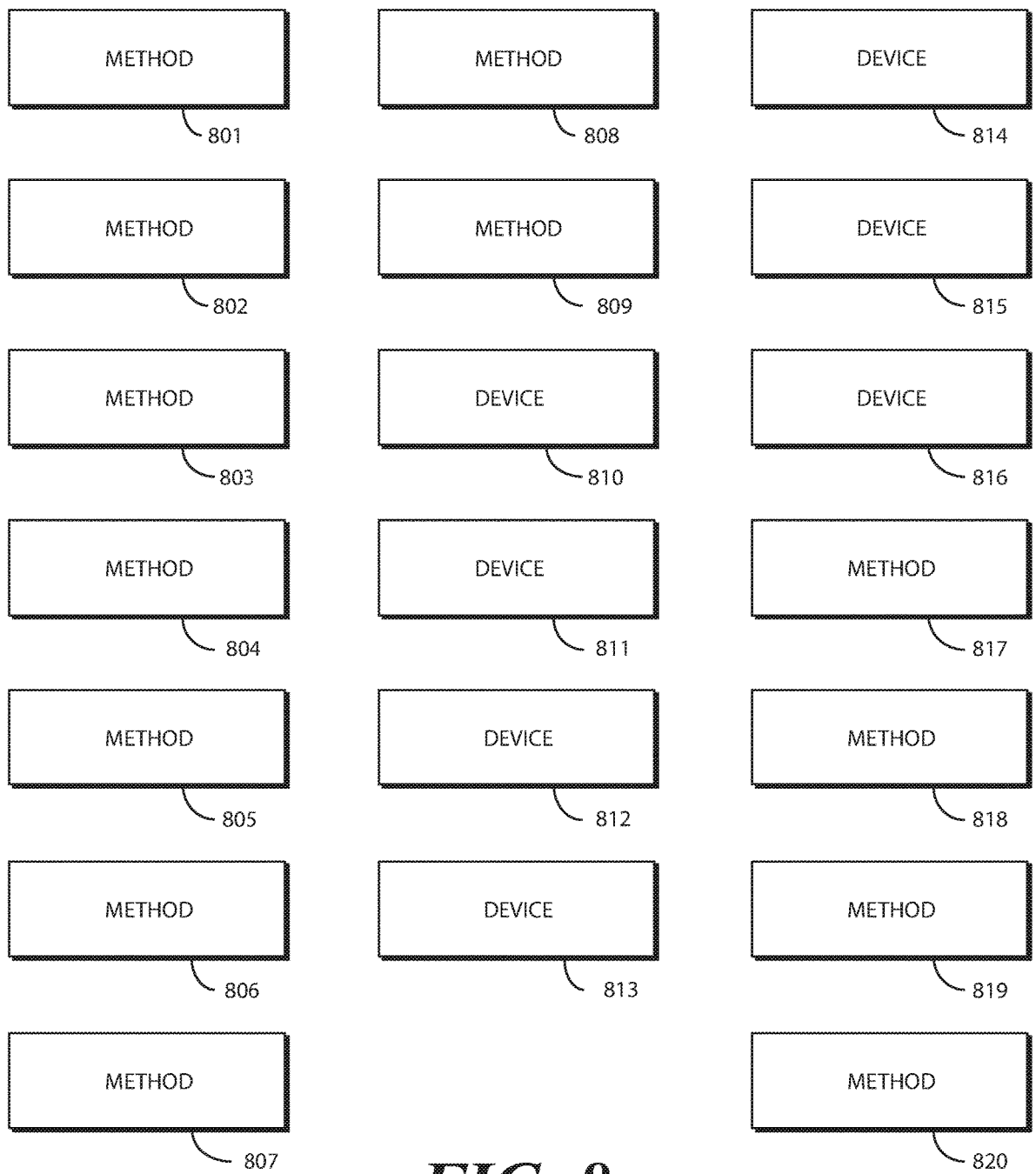
FIG. 8 illustrates various embodiments of the disclosure.

Turning now to FIG. 8, illustrated therein are various embodiments of the disclosure. The embodiments of FIG. 8 are shown as labeled boxes in FIG. 8 due to the fact that the individual components of these embodiments have been illustrated in detail in FIGS. 1-7, which precede FIG. 8. Accordingly, since these items have previously been illustrated and described, their repeated illustration is no longer essential for a proper understanding of these embodiments. Thus, the embodiments are shown as labeled boxes.

At 801, a method in an electronic device comprises receiving, with a first communication device from a prospective client device seeking to establish a secure communication session with the electronic device, client information via a first medium of communication. At 801, the method comprises receiving, with a second communication device, a client certificate from a remote electronic device via a second medium of communication that is different from the first medium of communication.

At 801, the method comprises verifying, by one or more processors of the electronic device, that the prospective client device and the remote electronic device are the same device. At 801, the method comprises establishing the secure communication session when the prospective client device and the remote electronic device are verified as the same device.

At 802, the first medium of communication of 801 comprises an optical communication channel. At 803, the second medium of communication of 801 comprises a wireless radio communication channel.

At 804, the receipt of the client information occurring at 801 comprises scanning a quick response (QR) code presented on a display of the prospective client device. At 805, the QR code of 804 has embedded therein a password or a primary key. At 806, the QR code of 805 has embedded therein one or both of an Internet protocol (IP) address and/or a client certificate digest.

At 807, the verifying that the prospective client device and the remote electronic device of 806 are the same device comprises determining whether the client certificate includes information found in the client certificate digest. At 808, the method of 805 comprises deriving a shared key from the password or the primary key, encrypting a server certificate digest with the shared key, and transmitting the server certificate digest to the remote electronic device. At 809, the verifying that the prospective client device and the remote electronic device of 808 are the same device comprises determining whether the client certificate includes at least some of the client information obtained from the QR code.

At 810, an electronic device comprises a first communication device operable across a first medium of communication. At 810, the electronic device comprises a second communication device operable across a second medium of communication that is different from the first medium of communication.

At 810, the electronic device comprises one or more processors operable with the first communication device and the second communication device. At 810, the one or more processors obtain a client certificate digest from a prospective client device using the first communication device. Thereafter, at 810 the one or more processors receive a client certificate from a remote electronic device using the second communication device. At 810, the one or more processors then verify that the prospective client device and the remote electronic device are the same device by determining whether the client certificate includes information from the client certificate digest.

At 811, the first communication device of 810 comprises an optical communication device and the second communication device comprising a wireless radio communication device. At 812, the one or more processors of 811 obtain the client certificate digest by using the first communication device to scan a quick response (QR) code.

At 813, the one or more processors of 812 further encrypt a server certificate digest using an encryption key derived from information obtained from the QR code. At 813, the one or more processors use the second communication device to transmit the server certificate digest to the remote electronic device after encryption.

At 814, the one or more processors of 813 cause the second communication device to transmit a client certificate request to the remote electronic device. At 814, the one or more processors receive the client certificate from the remote electronic device in response to the client certificate request.

At 815, the one or more processors of 813 establish a secure communication session with the remote electronic device when the remote electronic device is verified as being the same device as the prospective client device. At 816, the one or more processors of 813 preclude establishment of a secure communication session with the remote electronic device when the remote electronic device and the prospective client device are determined to be different devices.

At 817, a method in an electronic device comprises generating, with one or more processors of the electronic device, a self-signed client certificate. At 817, the method comprises generating, with the one or more processors, a client certificate digest from the self-signed client certificate.

At 817, the method comprises generating, with the one or more processors, a visible representation of the client certificate digest and a password or primary key. At 817, the method comprises presenting, with the one or more processors on a display of the electronic device, the visible representation of the client certificate digest and the password or primary key.

At 817, the method comprises transmitting, with a wireless communication device, wireless electronic signals containing the client certificate to a remote electronic device. At 817, the method comprises thereafter establishing, with the wireless communication device, a secure communication session with the remote electronic device.

At 818, the method of 817 further comprises receiving a server certificate digest from the remote electronic device and verifying that the server certificate digest was encrypted with an encryption key derived from at least some information presented in the visible representation. At 818, the transmitting the wireless electronic signals containing the client certificate to the remote electronic device occurs only when the server certificate digest was encrypted with the encryption key derived from the at least some information presented in the visible representation.

At 819, the visible representation of 818 comprises a quick response (QR) code and the at least some information presented in the QR code comprises a password or primary key. At 820, the verifying of 819 that the server certificate digest was encrypted with the encryption key derived from at least some information presented in the visible representation occurs without utilization of a certificate authority or a root certificate store.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method in an electronic device, the method comprising:
receiving, with a first communication device, from a prospective client device seeking to establish a secure communication session with the electronic device, client information via a first medium of communication;
receiving, with a second communication device, a client certificate from a remote electronic device via a second medium of communication that is different from the first medium of communication by scanning a quick response (QR) code presented on a display of the prospective client device and without communication with, or engagement or utilization of, a certificate authority, the QR code having encoded therein a randomly generated password generated on a per-session basis when the client information is generated and encrypting the client certificate;
verifying, by one or more processors of the electronic device, that the prospective client device and the remote electronic device are the same device; and
establishing the secure communication session when the prospective client device and the remote electronic device are verified as the same device.

2. The method of claim 1, the first medium of communication comprising an optical communication channel.

3. The method of claim 2, the second medium of communication comprising a wireless radio communication channel.

4. The method of claim 1, wherein the QR code further comprises one or more of an Internet protocol address and/or a username.

5. The method of claim 4, wherein the secure communication session comprises a peer-to-peer communication session.

6. The method of claim 1, the QR code further having embedded therein a client certificate digest generated on a per-session basis when the client information is generated.

7. The method of claim 6, wherein the verifying that the prospective client device and the remote electronic device are the same device comprises determining whether the client certificate can be decrypted using a derived decryption key based upon the randomly generated password received from the prospective client device and encoded in the QR code.

8. The method of claim 5, further comprising deriving a shared key from the randomly generated password, encrypting a server certificate digest with the shared key, and transmitting the server certificate digest to the remote electronic device.

9. The method of claim 8, wherein the verifying that the prospective client device and the remote electronic device are the same device comprises determining whether the client certificate is encrypted using a derived decryption key based upon the randomly generated password obtained from the QR code.

10. An electronic device, comprising:
a first communication device operable across a first medium of communication;
a second communication device operable across a second medium of communication that is different from the first medium of communication; and
one or more processors operable with the first communication device and the second communication device, the one or more processors obtaining a client certificate digest presented optically in a quick response (QR) code from a prospective client device using the first communication device, thereafter receiving a client certificate encrypted with a randomly generated primary code presented in the QR code presenting the client certificate digest from a remote electronic device using the second communication device, and then verifying that the prospective client device and the remote electronic device are the same device by determining encryption of the client certificate occurred using the randomly generated primary code presented in the QR code with the client certificate digest.

11. The electronic device of claim 10, the first communication device comprising an optical communication device and the second communication device comprising a wireless radio communication device.

12. The electronic device of claim 11, the one or more processors obtaining the client certificate without communication with, or engagement or utilization of, a certificate authority.

13. The electronic device of claim 12, the one or more processors further encrypting a server certificate digest using the randomly generated primary code obtained from the QR code and using the second communication device to transmit the server certificate digest to the remote electronic device after encryption without communication with, or engagement or utilization of, the certificate authority.

14. The electronic device of claim 13, the one or more processors causing the second communication device to transmit a client certificate request to the remote electronic device, wherein the one or more processors receive the client certificate from the remote electronic device in response to the client certificate request, wherein the client certificate comprises a unique, self-signed secure sockets/transport layer security (SSL/TLS) security certificate.

15. The electronic device of claim 13, the one or more processors establishing a secure communication session with the remote electronic device when the remote electronic device is verified as being the same device as the prospective client device.

16. The electronic device of claim 13, the one or more processors precluding establishment of a secure communication session with the remote electronic device when the remote electronic device and the prospective client device are determined to be different devices.

17. A method in an electronic device, the method comprising:
generating, with one or more processors, a self-signed client certificate;
generating, with the one or more processors, a client certificate digest from the self-signed client certificate;

generating, with the one or more processors, a visible representation of the client certificate digest and a password or primary key;

presenting, with the one or more processors on a display of the electronic device, the visible representation of the client certificate digest and the password or primary key;

transmitting, with a wireless communication device, wireless electronic signals containing the self-signed client certificate to a remote electronic device;

receiving a server certificate digest from the remote electronic device and verifying that the server certificate digest was encrypted with an encryption key derived from at least some information presented in the visible representation; and thereafter establishing, with the wireless communication device, a secure communication session with the remote electronic device;

wherein the transmitting the wireless electronic signals containing the self-signed client certificate to the remote electronic device occurs only when the server certificate digest was encrypted with the encryption key derived from the at least some information presented in the visible representation.

18. The method of claim 17, wherein client certificate digest is hashed from the self-signed client certificate using a shared key derived from the password or primary key.

19. The method of claim 17, wherein the visible representation comprises a quick response (QR) code and the at least some information presented in the QR code comprises the password or primary key.

20. The method of claim 17, wherein the verifying that the server certificate digest was encrypted with the encryption key derived from at least some information presented in the visible representation occurs without utilization of a certificate authority or a root certificate store.

* * * * *